Aug. 13, 1963  A. MASCARO  3,100,645
SPREADER FOR FERTILIZER AND THE LIKE
Filed May 23, 1961  3 Sheets-Sheet 1
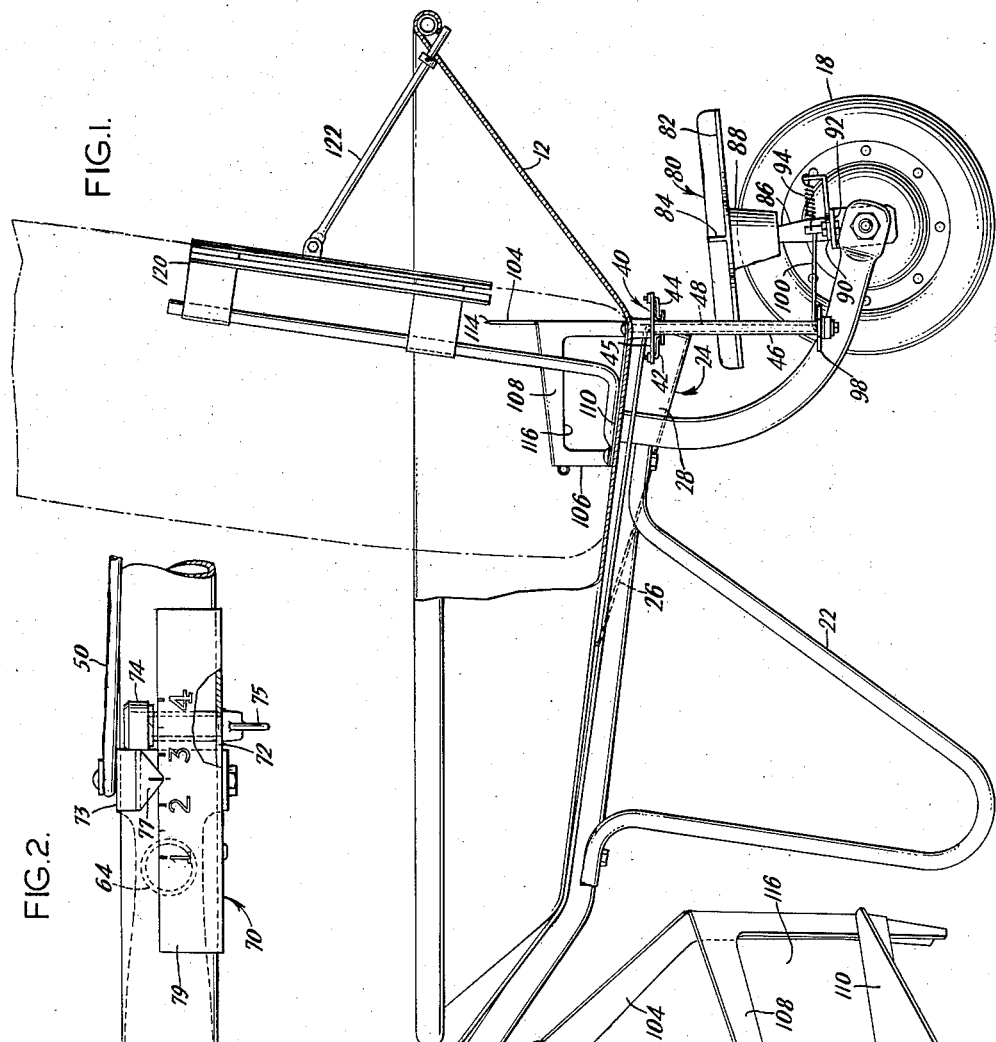
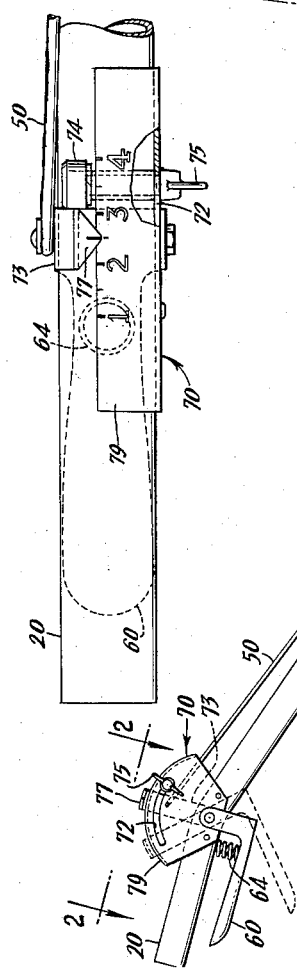
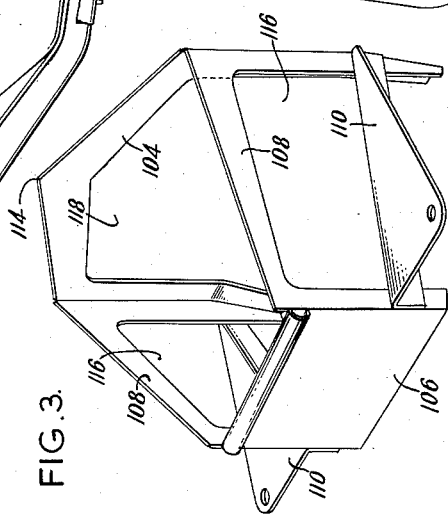
INVENTOR.
ANTHONY MASCARO
BY Howson & Howson
ATTYS.

Aug. 13, 1963  A. MASCARO  3,100,645
SPREADER FOR FERTILIZER AND THE LIKE
Filed May 23, 1961  3 Sheets-Sheet 3
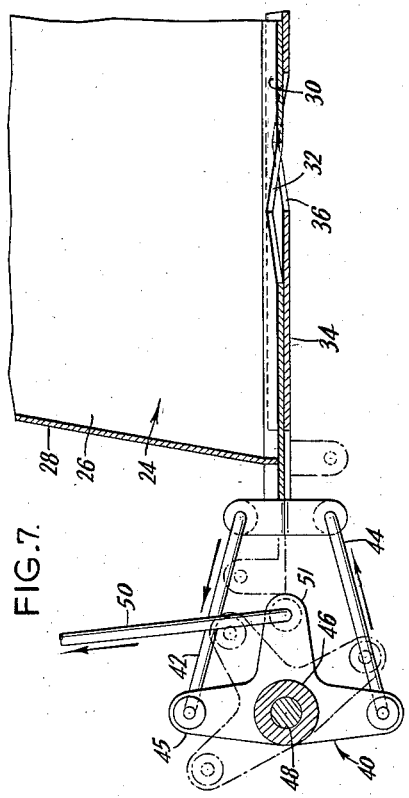
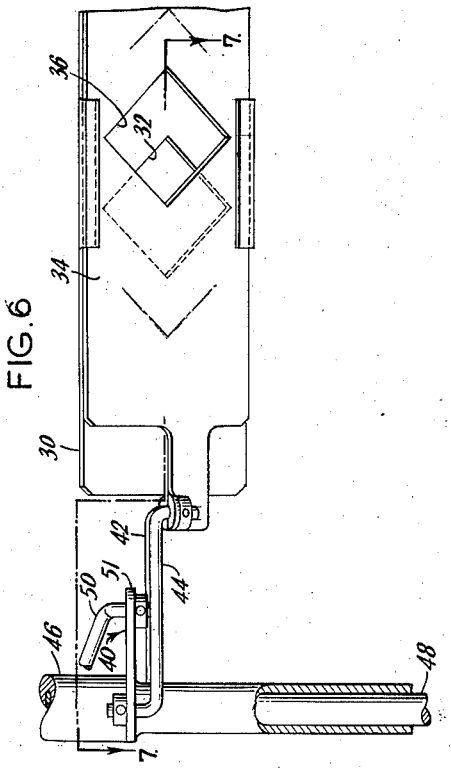
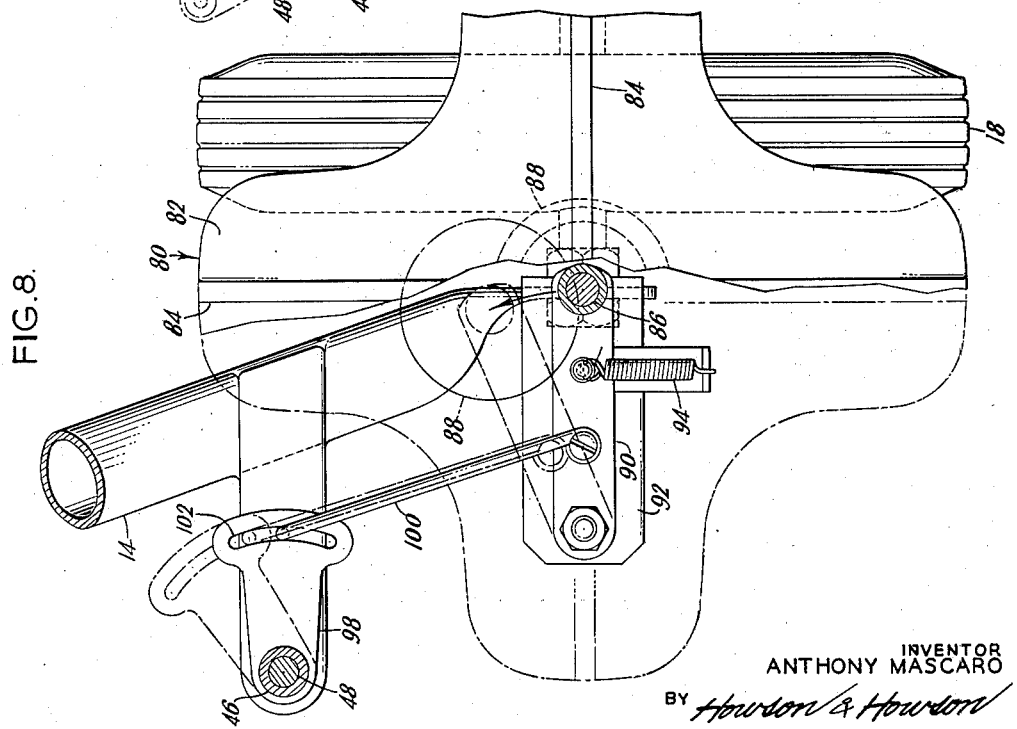
INVENTOR
ANTHONY MASCARO
BY Howson & Howson
ATTYS.

United States Patent Office 3,100,645
Patented Aug. 13, 1963

3,100,645
SPREADER FOR FERTILIZER AND THE LIKE
Anthony Mascaro, Gem's Grasslan Farms,
West Point, Pa.
Filed May 23, 1961, Ser. No. 112,080
9 Claims. (Cl. 275—8)

This invention relates to spreaders for fertilizer and like granular, pulverulent materials, and more particularly to improvements in a mobile spreader unit adapted for manual operation on lawns and gardens generally of the type shown in my prior Patent No. 2,841,401, entitled "Spreader for Fertilizer and the Like," issued on July 1, 1958.

An object of the present invention is to provide a mobile spreader unit of the above type including novel means for selectively varying the material discharge opening whereby the user may control selectively the flow rate of the material and whereby the use of the spreader is not limited to material of a particular grain size.

Another object of the persent invention is to provide a novel device of this character having a rotatable spreader element for dispersing granular material actuatable between an operative position to distribute the material uniformly over the vegetation of a lawn or garden upon advance or forward movement of the device when the discharge opening is open and an inoperative position when the discharge opening is closed.

A further object of the present invention is to provide a mobile spreader unit suitable for use with granular material packaged in bags wherein the bag is opened to discharge the material therein by simply placing the bag in the unit thereby minimizing handling of the granular material by the user.

A still further object of the present invention is to provide a device of the above type having the features and characteristics set forth which is of comparatively simplified construction which is inexpensive to manufacture and is fully effective in operation and use.

These and other objects of the present invention and the various features and details of the construction and operation thereof are more fully set forth hereinafter with reference to the accompanying drawings in which:

FIG. 1 is a side elevation partially in section of a spreader made in accordance with the present invention;

FIG. 2 is an enlarged sectional view taken on the line 2—2 of FIG. 1;

FIG. 3 is a detached perspective view of a bag-opening device adapted to puncture a bag as it is placed in the spreader and permit discharge of the granular material from the bag;

FIG. 6 is an enlarged fragmentary elevation showing structural details of the discharge opening valve control;

FIG. 7 is an enlarged sectional view taken on line 7—7 of FIG. 6; and

FIG. 8 is an enlarged sectional view taken on the line 8—8 of FIG. 5.

Figure 4:
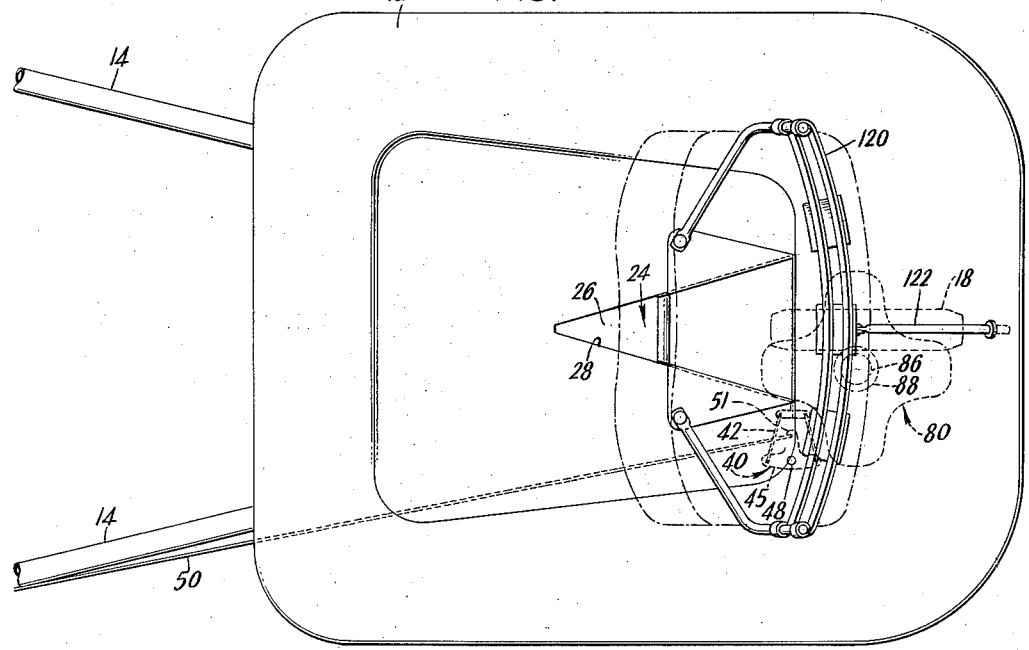
FIG. 4 is a top plan view of the spreader shown in FIG. 1.
Figure 5:
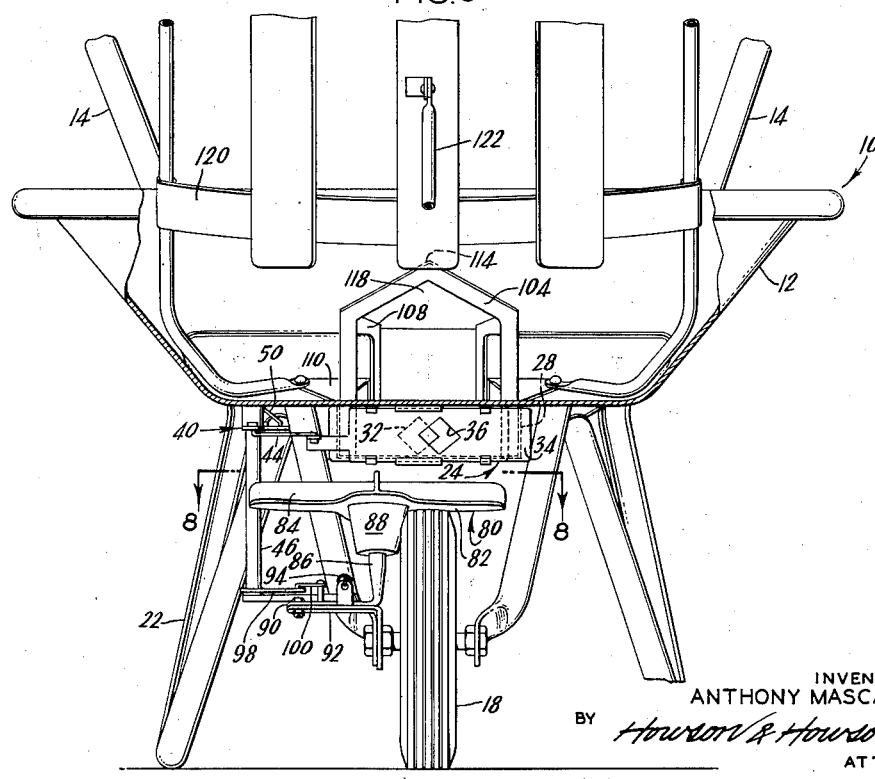
FIG. 5 is an enlarged front elevation of the spreader partially in section.

Referring now to the drawings and particularly to FIG. 1 thereof, there is shown a conventional wheelbarrow modified in accordance with the present invention for use as a mobile spreader unit and which includes a concave receptacle or pan 12 mounted on two non-parallel bars 14 which rotatably suport a single wheel 18 at their converging ends and provide handle grips 20 at their diverging ends. A leg support 22 depends from each of the bars 14 to maintain the unit in an upright position when desired.

In accordance with the present invention, means is provided for selectively discharging fertilizer or other granular material contained in the receptacle 12 at a predetermined variable flow rate to a spreader element which distributes the material uniformly over the vegetation of a lawn or garden. To this end, a bay 24 providing a delivery chute is formed in the receptacle in the present instance by a V-shaped forwardly declining wall 26 depending from the underside of the receptacle 12 and which is connected thereto along its side edges by side walls 28. The forward portion of the bay 24 is closed by a vertical front wall 30 having a discharge opening 32 therein through which granular material is discharged.

Means is provided for selectively controlling the rate of discharge of the granular material through the discharge opening 32. To this end, there is provided a laterally slidable valve element in the present instance in the form of a plate 34 overlying the front wall 30 and having an orifice 36 therein adapted to register with the discharge opening 32 to provide an outlet for the material upon relative lateral movement of the plate 34 and front wall 30. In the embodiment illustrated, the front wall 30 and plate 34 each are mounted for simultaneous lateral movement and operating means is provided to effect stepwise relative lateral movement thereof to vary selectively the size of the outlet through which material can flow between a fully open limit position and a completely closed limit position. In the fully open limit position, the opening 32 and orifice 36 are in complete registry for maximum flow and in the closed limit position, the opening and orifice are out of registry for no flow when the spreader is out of use. The intermediate positions from fully registered to out-of-registry provide a progressively smaller outlet and therefore a progressively reduced flow rate.

The operating means comprises a T-shaped bell crank 40 mounted on a tubular sleeve 46 rotatably supported on a shaft 48 depending from the base of the receptacle 12. A link 42 connects the front wall 30 to one end of the crossbar 45 of the bell crank and link 44 connects the plate 34 to the opposite end of the bar 45, whereby rotation of the bell crank effects a simultaneous opposed lateral movement of the front wall 30 and plate 34 relative to one another to selectively vary the effective size of the discharge outlet (see FIG. 7).

Manual remote control means in the present instance a wire 50 is provided to rotate the bell crank 40 and is connected at one end to the leg 51 of the bell crank and at its other end to a control lever 60 mounted on one of the handles in the reach of the user during normal operation of the spreader. The control lever 60 as best shown in FIG. 1 is normally biased to an extended position shown in broken lines by a coil spring 64 in which position the openings 32 and 36 are out-of-registry and there is no flow of the granular material. When it is desired to spread fertilizer, the lever 60 is depressed by the user, registering the openings in the front wall 30 and the plate 34 and permitting discharge of granular material.

To set the material discharge selectively for a predetermined flow rate, a stop mechanism is provided to limit movement of the control lever 60. To this end, a plate 70 having an arcuate slot 72 therein is mounted on the handle adjacent the control lever 60 and a stop member 74 is movably mounted in the slot 72 in the path of an arm extension 73 of the control lever 60. The stop member 74 may be secured at a predetermined position in the slot by means of a wing nut 75. The arm extension 73 mounts an indicator 77 which overlies a peripheral flange 79 of the plate 70 having indicia thereon to indicate the effective discharge opening. Accordingly, the user sets the stop member 74 for a desired flow and when the lever is depressed by the hand of the user as he grips the handle, the arm extension 73 engages the stop member 74 to provide the desired discharge opening. When the lever is released, the tension spring 64 returns the lever to its normally extended position and the discharge openings 32 and 36 are moved out-of-registry thereby cutting off the flow of the granular material.

A spreader element 80 is mounted adjacent the discharge and is operable to spread material uniformly over the vegetation of a lawn or garden. The spreader element 80 comprises a flat base plate 82 having a plurality of upstanding vanes 84. The base plate 82 is supported for rotation on an upright shaft 86 mounted adjacent the front wheel 18 and mounts a friction drive pulley 88 operable to engage the tire portion of the wheel and upon rotation of the wheel effect rotation of the spreader element. It is noted that the material discharge opening is offset laterally from the center of the spreader element 80 and therefore the major part of the material discharged is deposited on a point at one side of the spreader element. Since the spreader element 80 is rotating under the action of the wheel, the centrifugal force causes a distribution of the material to both sides of the spreader element and to the front, very little being distributed rearwardly since the majority of the material has been thrown off the spreader element. The position of the discharge outlet relative to the spreader element 80 remains fixed during relative lateral movement of the plate 34 and front wall 30 between open and closed limit positions to provide a uniform spreading pattern of the granular material throughout the range of adjustment of the plate and the front wall.

In accordance with the invention, means coupled with the control lever is provided for selectively disposing the spreader element 80 in an operative position and in an inoperative position. In the operative position, the spreader element 80 is driven concurrently with the wheel upon advance of the unit to disperse material when the openings 32 and 36 are in registry and material is being discharged and in the inoperative position, the spreader element is disposed independent of the wheel when the openings are out-of-registry and flow of material is cut off. To this end, the upright shaft 86 is mounted at one end of a bar 90, the opposite end of which is pivotally secured to a bracket 92 projecting axially of the wheel axle as shown in FIG. 8. The spreader is normally biased to an operative position wherein the drive pulley 88 engages the tire portion of the wheel 18 to actuate the spreader by a tension spring 94 fixed at one end to the bracket 92 and at the other end to the bar 90.

Actuating means is provided to displace the spreader element to the inoperative position out of the path of travel of the tire portion and in the present instance comprises a link 98 mounted on the lower end of the collar 46 and connected to the bar 90 through a rod 100. A slotted opening 102 is provided in the link 98 within which the outer end of the rod 100 engages. Thus, when it is desired to discharge material, the control lever 60 is depressed by the operator which through the wire 50 rotates the tubular sleeve 46 to open the discharge opening and simultaneously moves the link 98 in a direction which permits the coil spring to move the drive pulley 88 into engagement with the tire portion of the wheel 18 to rotate the spreader as the spreader unit is advanced. It is noted that the slotted opening 102 permits adjustment of the lever 60 to a range of positions wherein there is an effective discharge opening without displacing the spreader to an inoperative position until the discharge opening is completely closed.

Another important feature of the present invention is the provision of a bag-opening device in the receptacle of the spreader which serves to provide an access opening in a bag containing granular material when the user places the bag in the receptacle thereby minimizing handling of the granular material by the user. As best shown in FIG. 3, the device is of generally trapezoidal configuration consisting of upstanding front, rear and side walls 104, 106, and 108 respectively. The device has a flange member 110 projecting outwardly from each of the side walls 108 and nests in the bay 24 with the flange members overlying the receptacle adjacent the bay to support the device in an upright position. The upper edge of the front wall 104 converges to a point at 114 and the upper edge of each of the side walls is blunt so that as a bag is placed over the device, these edges pierce the bag to provide a three-sided so-called barn door opening thereby permitting flow of material to the discharge chute through the window openings 116, 118 and the top of the device. The upper edge of the rear wall 106 is turned down to provide a rounded edge which serves to tuck the flap formed by the barn door opening upwardly and prevent material from spilling to the receptacle outside of the confines of the device. A frame 120 is mounted at a slight forward inclination in the forward end of the receptacle in front of the bag-opener and delivery chute to support the bag. As shown in FIG. 1, the frame is secured to the flange members 110 by rivets and is supported by an adjustable arm 122 fitted at one end to the frame 120 and at the other end to the front wall of the receptacle.

It is noted that the bag-supporting frame and bag-opening device may be easily removed so that the wheelbarrow can be used for other conventional purposes. It is further noted that since the front wall 30 is disposed in a vertical plane, there is no danger of damage thereto when the wheelbarrow is used to support other items. If desired the supporting frame may also be employed as a tool rack or the like.

While a particular embodiment of the present invention has been illustrated and described herein, it is to be understood that changes and modifications may be incorporated within the scope of the following claims.

I claim:

1. A mobile spreading unit comprising a receptacle for granular, pulverulent material, at least one wheel supporting the receptacle, means defining a discharge outlet in said receptacle including a valve element for selectively varying flow of material through said discharge outlet, said valve element actuatable between a first limit position affording flow of material through said discharge outlet and a second limit position closing said discharge outlet, a spreader element underlying said discharge outlet operable to disperse said granular material, actuation of said valve element between said limit positions operable to vary the size of said discharge outlet and maintain the center of said discharge outlet in a substantially fixed position relative to said spreader element thereby to provide a uniform spreading pattern throughout the range of adjustment of the size of said discharge outlet, means mounting said spreader element for rotation in an operative position to be driven concurrently with the wheel upon advance of said unit to disperse said material and a non-rotatable inoperative position independent of the wheel and a common operator for said valve and spreader elements for positioning said spreader element in said operative position when said valve element is in said first position for selectively actuating said valve element to provide a discharge outlet of predetermined size and for positioning said spreader element in said inoperative position when said valve element is in said second position.

2. A mobile spreading unit comprising a receptacle for granular, pulverulent material, at least one wheel supporting the receptacle, means defining a bay including a vertical wall and depending from said receptacle forming a discharge chute for said granular material, means defining a discharge outlet in said vertical wall including a valve element for selectively varying flow of material through said discharge outlet, said valve element actuatable between a first limit position affording flow of material through said discharge outlet and a second limit position closing said discharge outlet, a spreader element underlying said discharge outlet operable to disperse said granular material, actuation of said valve element between said limit positions operable to vary the size of said discharge outlet and maintain the center of said discharge outlet in a substantially fixed position relative to said spreader element thereby to provide a uniform spreading pattern throughout the range of adjustment of the size of said discharge outlet, means mounting said spreader element for rotation in an operative position to be driven concurrently with the wheel upon advance of the unit to disperse said material and a non-rotatable inoperative position independent of the wheel and a common operator for said valve and spreader element for positioning said spreader element in said operative position when said valve element is in said first position and in said inoperative position when said valve element is in said second position.

3. A mobile spreading unit comprising a receptacle for granular, pulverulent material, at least one wheel supporting the receptacle, means defining a discharge outlet in said receptacle, a valve element for selectively varying flow of material through said discharge outlet, said valve element actuatable stepwise between a first limit position affording flow of material through said discharge outlet and a second limit position closing said discharge outlet, an upright stub shaft mounted on said unit adjacent said wheel, a spreader element underlying said discharge outlet operable to disperse said granular material, actuation of said valve element between said limit positions operable to vary the size of said discharge outlet and maintain the center of said discharge outlet in a substantially fixed position relative to said spreader element thereby to provide a uniform spreading pattern throughout the range of adjustment of the size of said discharge outlet, said spreader element mounted for rotation on said shaft and comprising a substantially flat backing plate and a plurality of upstanding vanes disposed radial to said stub shaft, means mounting said spreader element in an operative position engaging said wheel to be rotated directly thereby upon advance of said unit to disperse said material and a non-rotatable inoperative position out of engagement with the wheel and a common operator for said valve and said spreader element for positioning said spreader element in said operative position when said valve element is in said first position for selectively actuating said valve element to provide a discharge outlet of predetermined size and for positioning said spreader element in said inoperative position when said valve element is in said second position.

4. A mobile spreading unit for granular, pulverulent material packaged in a bag comprising a receptacle, at least one wheel supporting the receptacle, means defining a bay including a vertical wall depending from said receptacle forming a discharge chute for said granular material, means defining a discharge outlet in said vertical wall including a valve element for selectively varying flow of material through said discharge outlet, said valve element actuatable between a first limit position affording flow of material through said discharge outlet and a second limit position closing said discharge outlet, a spreader element underlying said discharge outlet operable to disperse said granular material, actuation of said valve element between said limit positions operable to vary the size of said discharge outlet and maintain the center of said discharge outlet in a substantially fixed position relative to said spreader element thereby to provide a uniform spreading pattern throughout the range of adjustment of the size of said discharge outlet, means mounting said spreader element for rotation in an operative position to be driven concurrently with the wheel upon advance of the unit to disperse said material and a non-rotatable inoperative position independent of the wheel and a common operator for said valve and spreader element for positioning said spreader element in said operative position when said valve element is in said first position and in said inoperative position when said valve element is in said second position, a bag opening device including upstanding wall portions surrounding said discharge chute, means defining a window opening in at least one of said wall portions, the upper edge of at least one of said wall portions converging to a point to pierce said bag to facilitate flow of material directly to said chute and out through said window opening to said discharge outlet.

5. In a mobile spreading unit having a receptacle, a bay including a vertical wall having a discharge outlet depending from the receptacle forming a discharge chute and adapted for use with granular material packaged in a bag, a bag opening device for providing an outlet opening in said bag positioned relative to said discharge chute so that material from said bag passes directly into said discharge chute, said device including upstanding wall portions surrounding the discharge chute, at least one of said walls having an upper edge which converges to a point, other walls having flat upper side edges and one of said other walls having a rounded upper edge and at least one of said walls having a window opening so that when a bag is placed on the opening device, it is pierced to provide a three sided so-called barn door opening to facilitate flow of material directly from the bag to the discharge chute and out through said window opening to the discharge outlet.

6. In a spreading unit having a receeptacle for granular, pulverulent material, and at least one wheel supporting the receptacle, means defining a bay including a movable vertically disposed wall having an opening therein depending from the receptacle forming a discharge chute for said granular material, means for selectively varying flow of material through said opening comprising a movable plate overlying said vertical wall, means defining an orifice in said plate, means mounting said wall and plate for simultaneous lateral movement with respect to one another between a first limit position wherein said opening and orifice are in registry providing a discharge outlet affording flow of material therethrough and a second limit position wherein said orifice and opening are out of registry closing said discharge outlet, a spreader underlying said discharge outlet operable to disperse said granular material, actuation of said vertical wall and plate between said limit positions operable to vary the size of said discharge outlet and maintain the center of said discharge outlet in a substantially fixed position relative to said spreader element thereby to provide a uniform spreading pattern throughout the range of adjustment of the size of said discharge outlet, and operator means mounting said spreader element for rotation in an operative position to be driven concurrently with the wheel upon advance of the unit to disperse said material and a non-rotatable, inoperative position independent of the wheel and a common operator for said valve and spreader elements for positioning said spreader element in said operative position when said valve element is in said first position and in said inoperative position when said valve element is in said second position.

7. In a spreading unit according to claim 6 including an upright stub shaft mounted on said unit adjacent said wheel, a spreader element underlying said discharge outlet mounted for rotation on said shaft and comprising a substantially flat backing plate and a plurality of upstanding vanes disposed radial to said stub shaft, and means mounting said stub shaft for movement between an operative position to be driven concurrently with the wheel upon advance of the unit to disperse said material when said wall and plate are disposed in said first limit position and a non-rotatable inoperative position independent of the wheel when said wall and plate are disposed in said second limit position.

8. In a spreading unit according to claim 6 wherein said means for effecting lateral movement of said wall and plate with respect to one another between said first and second limit positions comprises a T-shaped bell crank pivotally mounted on said unit, a first link connecting said front wall to the outer end of the crossbar of the T-shaped bell crank, a second link connecting said plate to the opposite end of the bar of said bell crank and control means connected to said bell crank for effecting rotation thereof, rotation of said bell crank effecting lateral movement of said wall and plate with respect to one another between said first and second limit positions.

9. In a spreading unit according to claim 8 wherein said control means comprises a lever pivotally mounted on said unit, a control wire connected at one end to said lever and at the opposite end to said bell crank, biasing means normally urging said control lever in one direction to position said wall and plate in said second limit position, said control lever actuable stepwise in the opposite direction against the bias to position said wall and plate in said first limit position.

References Cited in the file of this patent
UNITED STATES PATENTS

| | | |
|---|---|---|
| 359,594 | Chandler | Mar. 22, 1887 |
| 460,120 | Eberhart | Sept. 29, 1891 |
| 528,732 | Musgrove | Nov. 6, 1894 |
| 676,925 | Stevens et al. | June 25, 1901 |
| 965,936 | Quickel et al. | Aug. 2, 1910 |
| 2,334,376 | Bauer | Nov. 16, 1943 |
| 2,451,128 | Thiesse | Oct. 12, 1948 |
| 2,626,083 | Masters | Jan. 20, 1953 |
| 2,703,193 | Seltzer | Mar. 1, 1955 |
| 2,804,998 | Kirschmann | Sept. 3, 1957 |
| 2,941,811 | Sherer | June 21, 1960 |